No. 677,423. Patented July 2, 1901.
G. A. OWEN.
MAIL SERVICE SYSTEM.
(Application filed Oct. 15, 1898.)
(No Model.) 13 Sheets—Sheet 1.
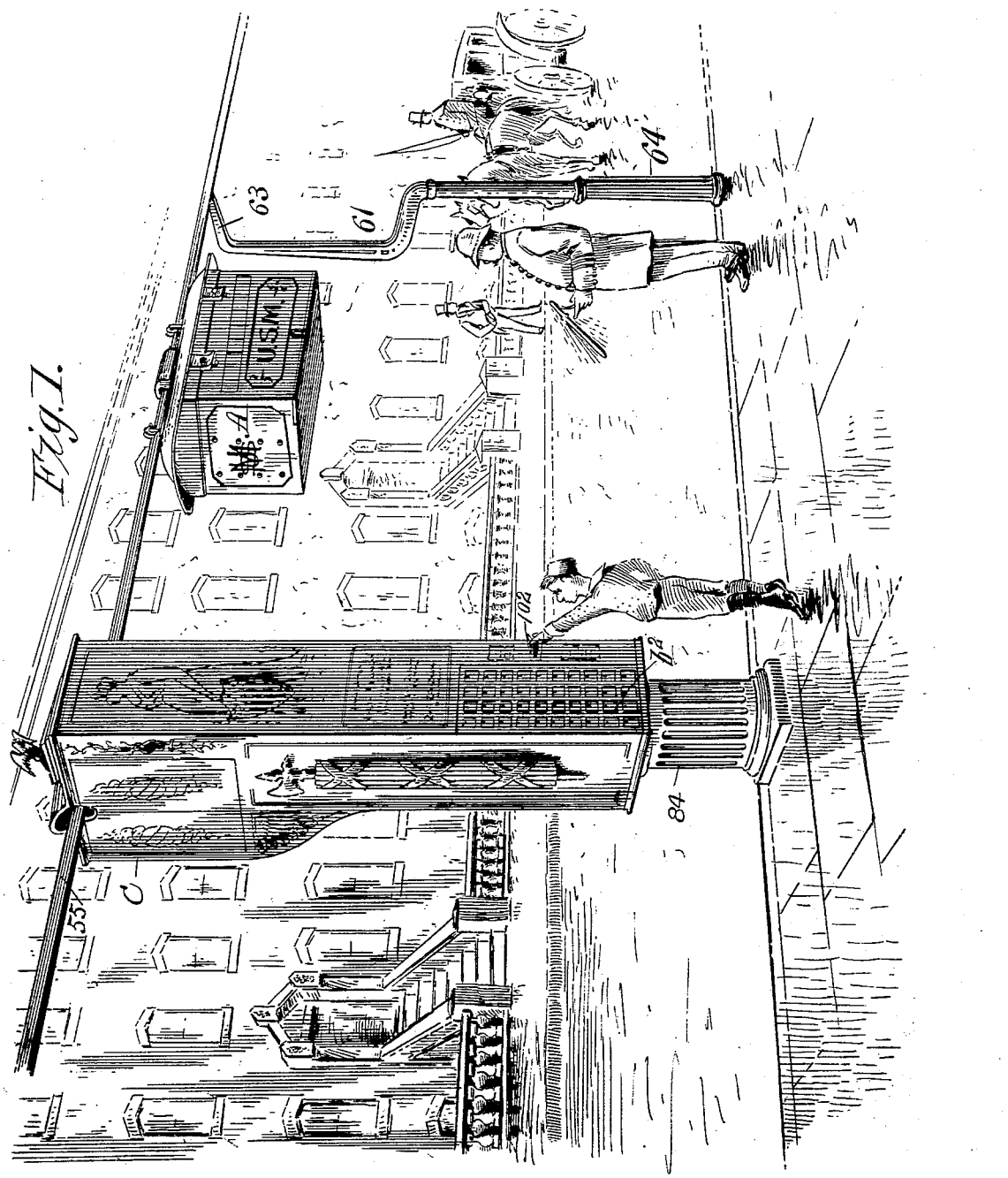
Witnesses: Inventor.
George Alfred Owen
by Attorney

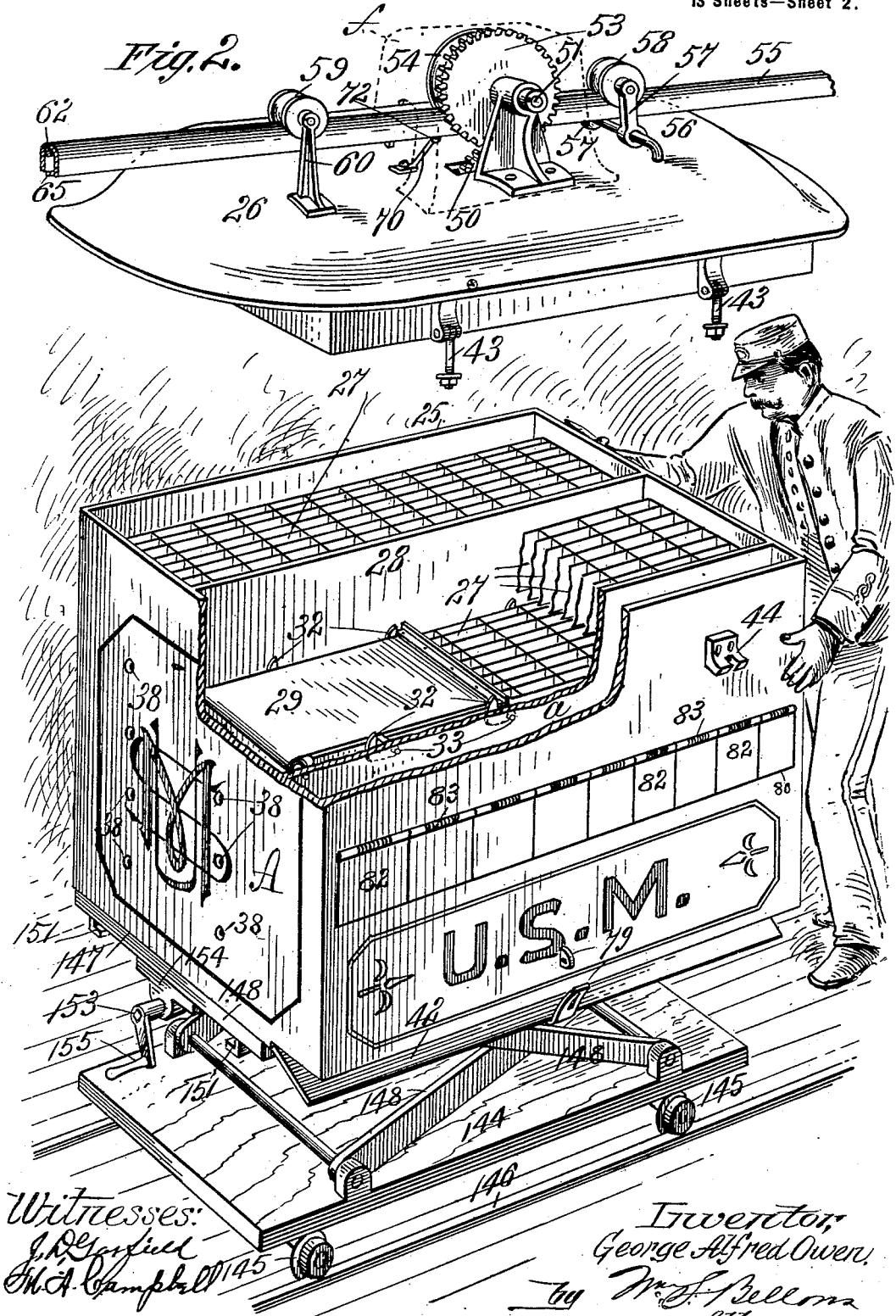

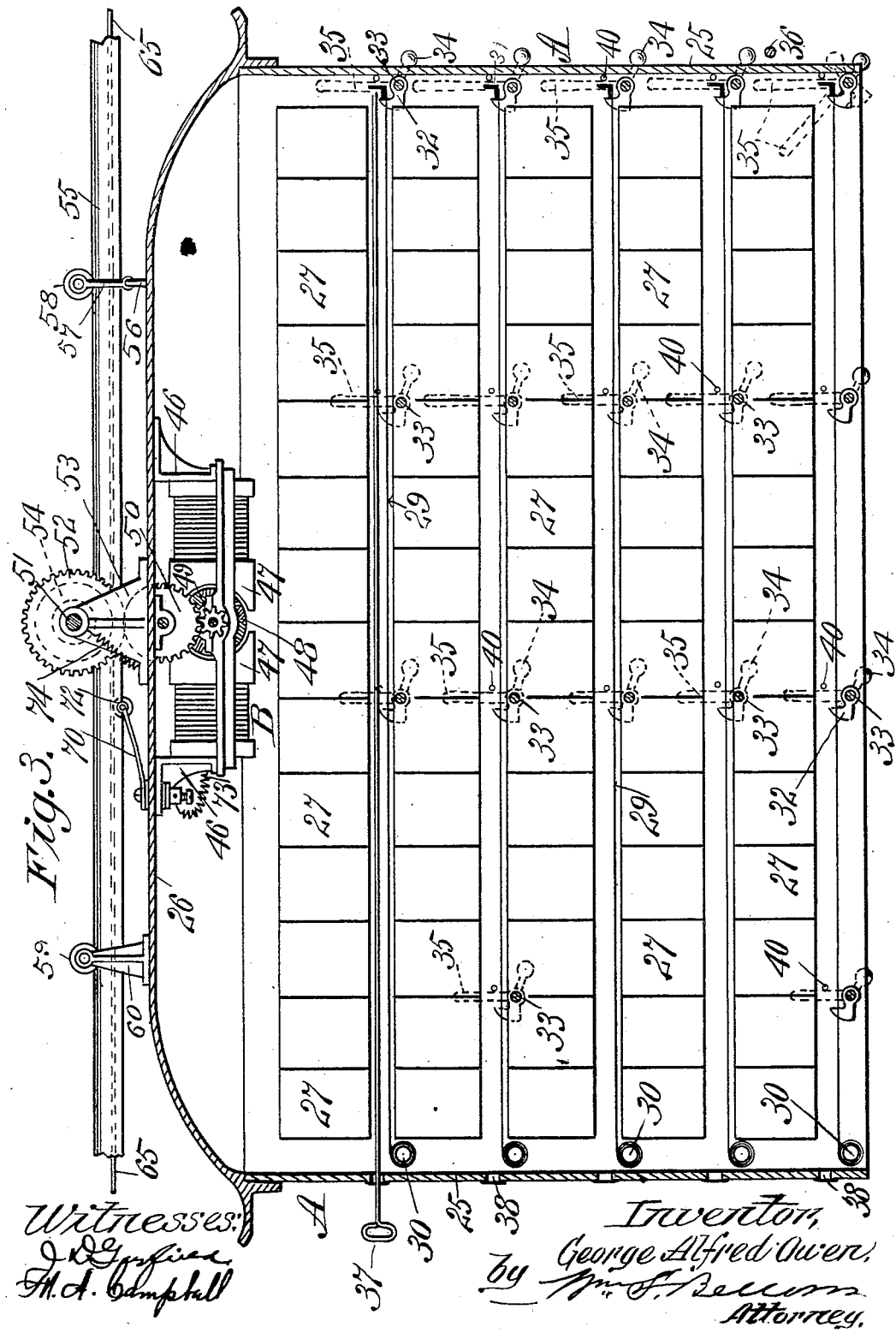

No. 677,423. Patented July 2, 1901.
G. A. OWEN.
MAIL SERVICE SYSTEM.
(Application filed Oct. 15, 1898.)
(No Model.) 13 Sheets—Sheet 4.
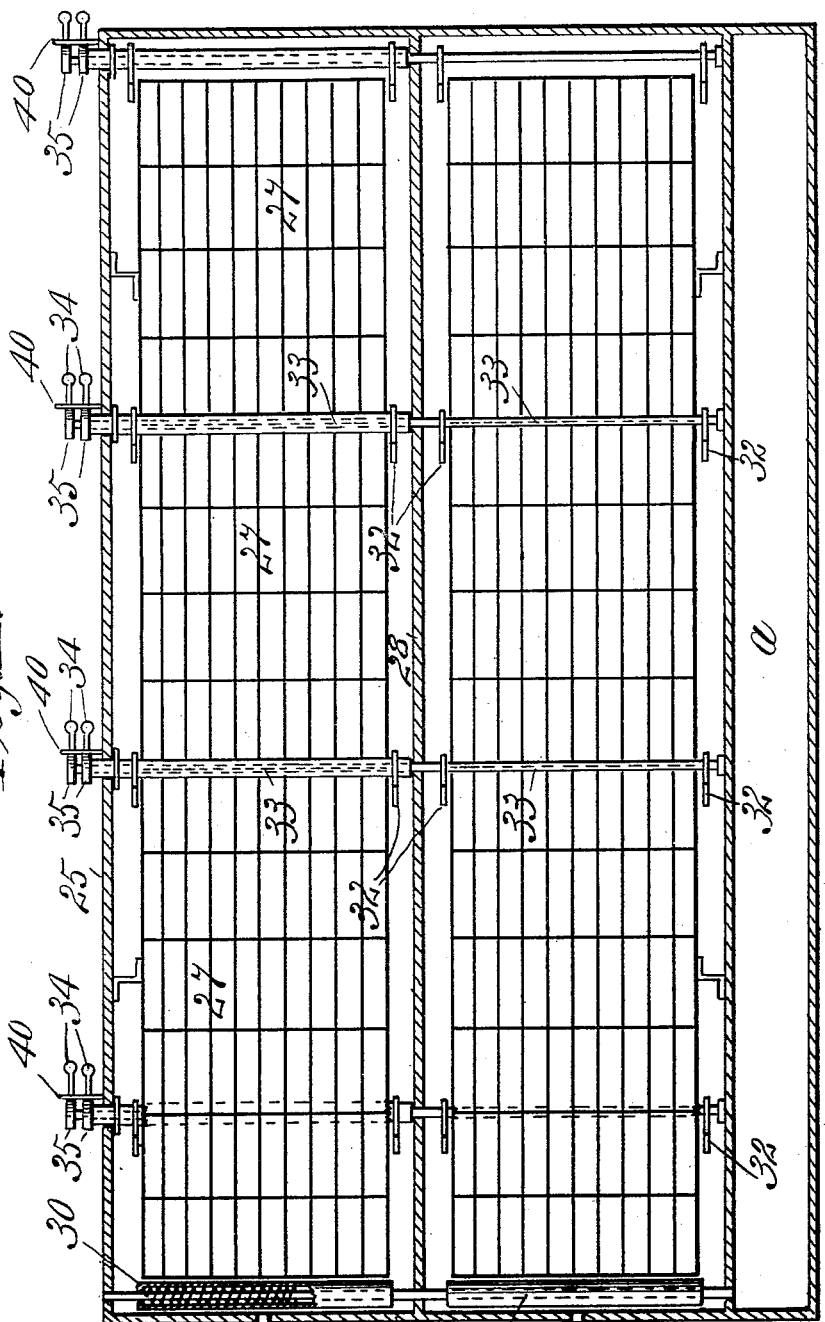

No. 677,423. Patented July 2, 1901.
G. A. OWEN.
MAIL SERVICE SYSTEM.
(Application filed Oct. 15, 1898.)
(No Model.) 13 Sheets—Sheet 5.
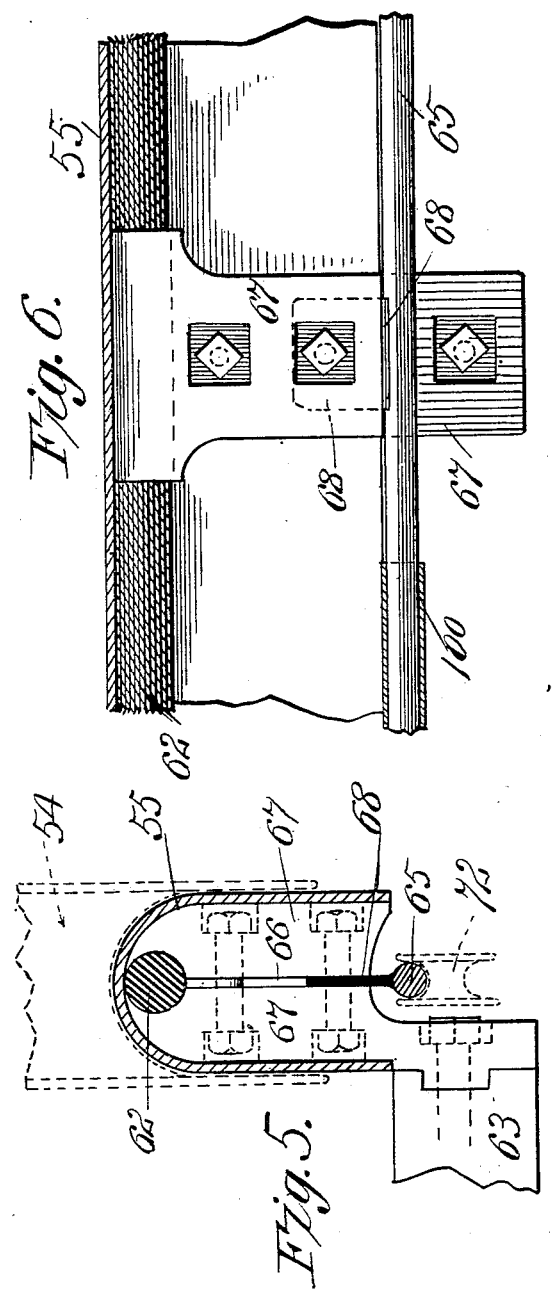
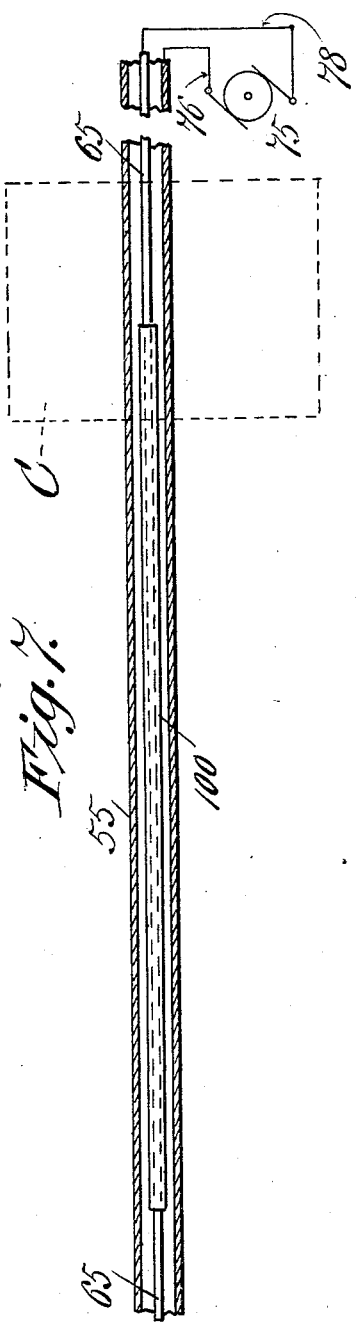

No. 677,423. Patented July 2, 1901.
G. A. OWEN.
MAIL SERVICE SYSTEM.
(Application filed Oct. 15, 1898.)
(No Model.) 13 Sheets—Sheet 6.
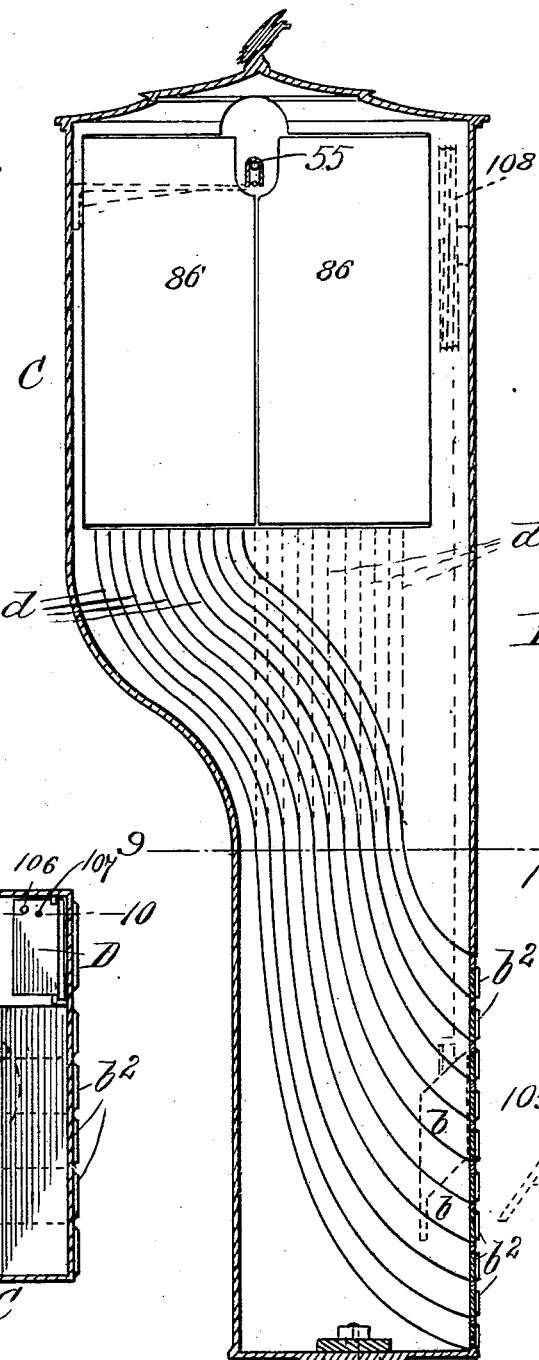
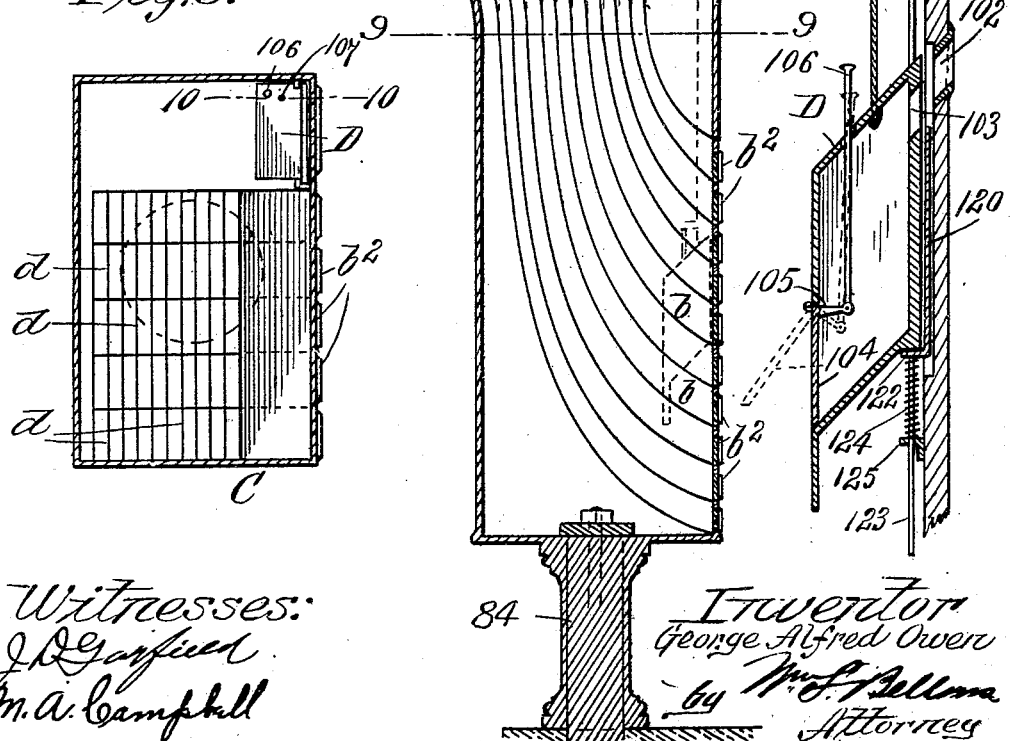

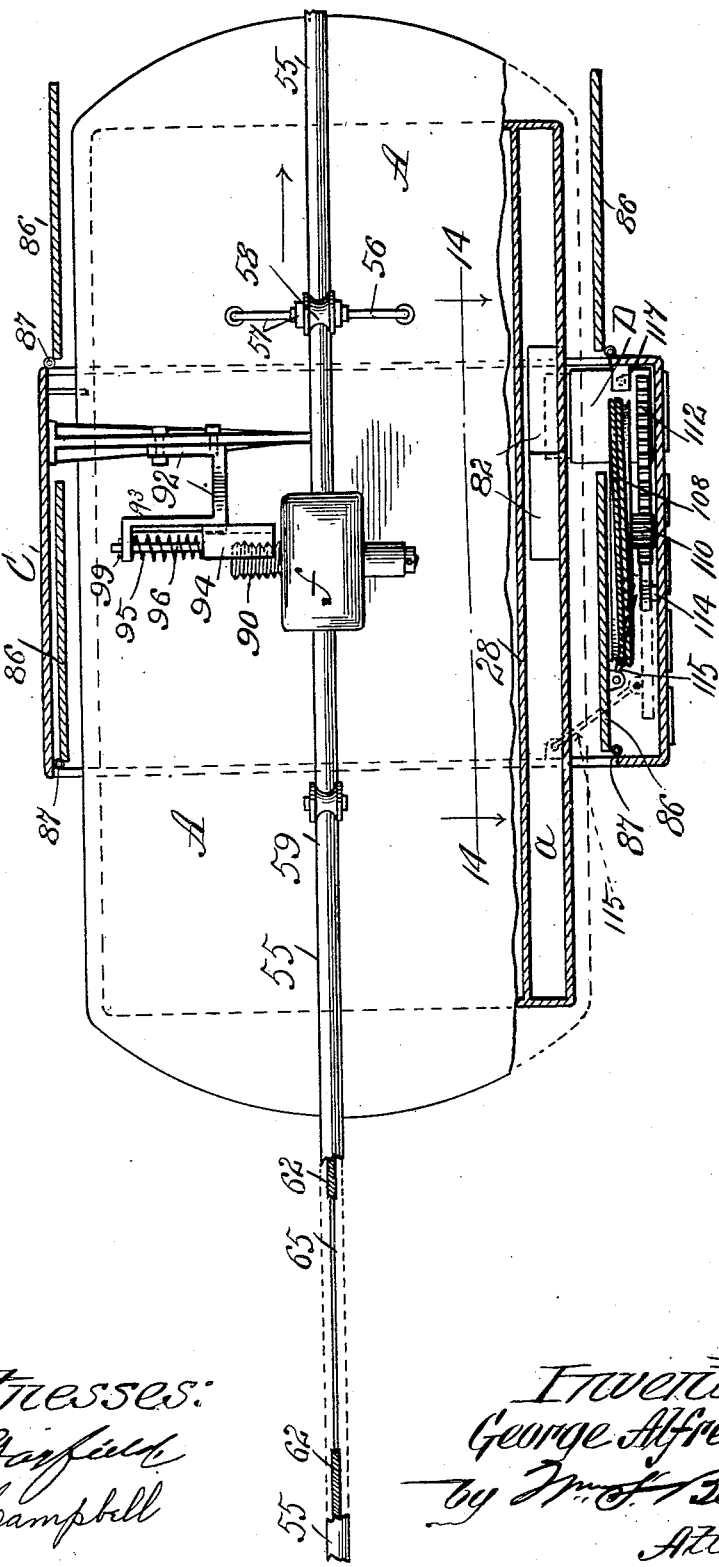

No. 677,423. Patented July 2, 1901.
G. A. OWEN.
MAIL SERVICE SYSTEM.
(Application filed Oct. 15, 1898.)
(No Model.) 13 Sheets—Sheet 8.
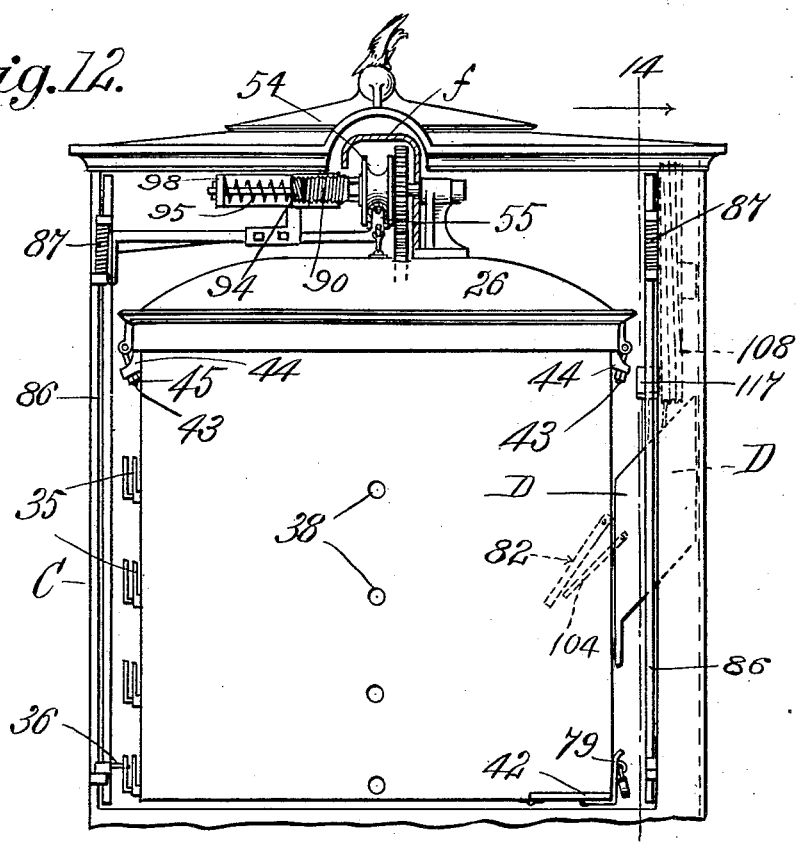
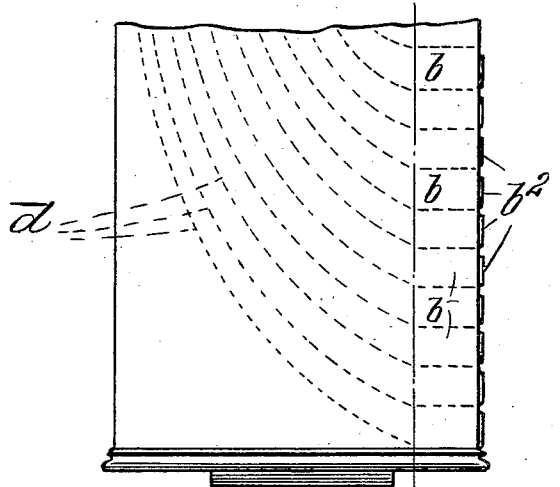

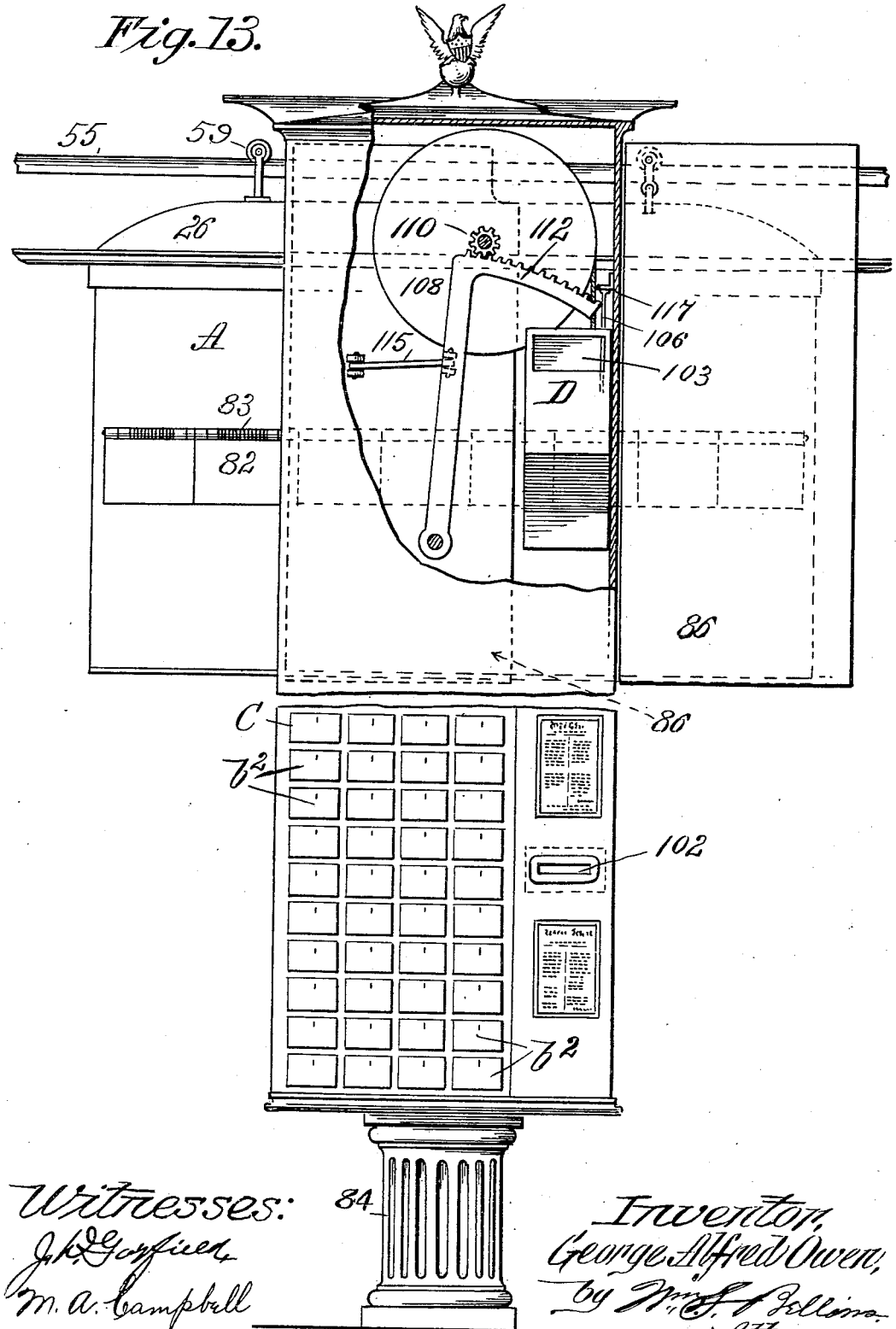

No. 677,423. Patented July 2, 1901.
G. A. OWEN.
MAIL SERVICE SYSTEM.
(Application filed Oct. 15, 1898.)
(No Model.) 13 Sheets—Sheet 10.
Fig. 14.
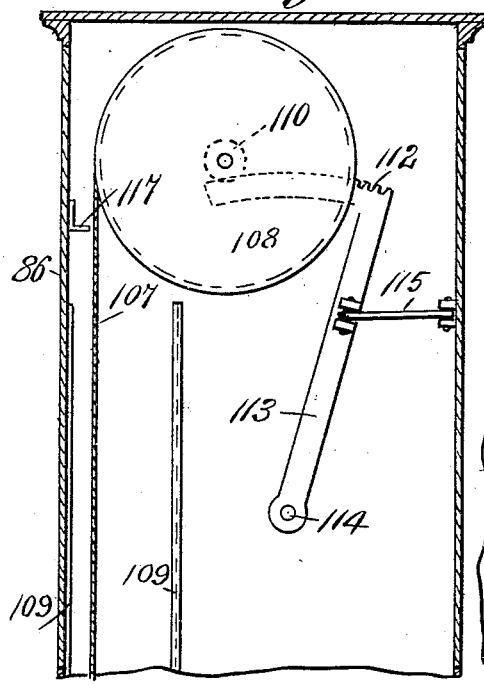
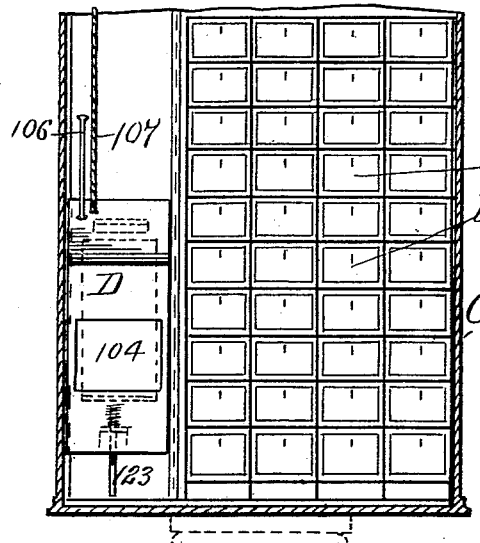
Fig. 15.
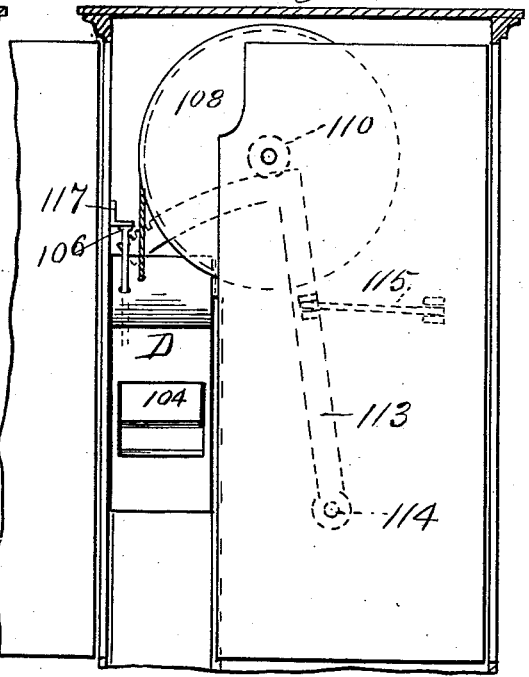
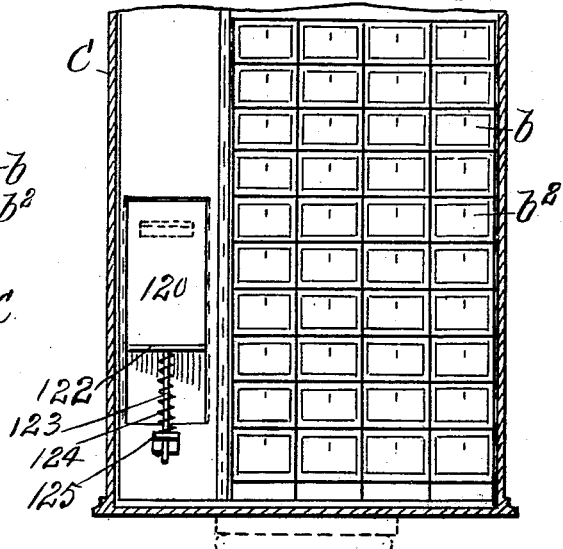
Witnesses:
Inventor
George Alfred Owen,
by
Attorney.

No. 677,423. Patented July 2, 1901.
G. A. OWEN.
MAIL SERVICE SYSTEM.
(Application filed Oct. 15, 1898.)
(No Model.) 13 Sheets—Sheet 11.
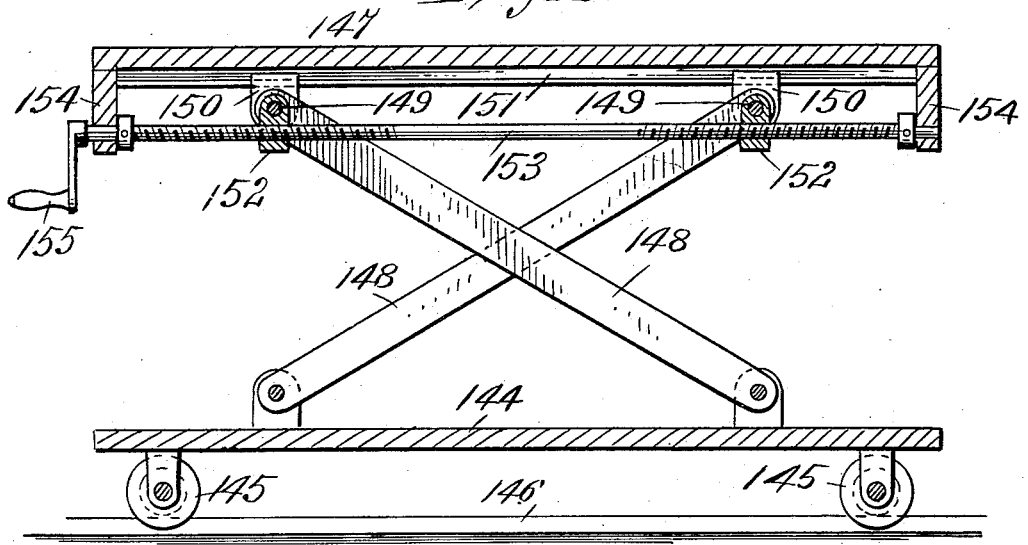
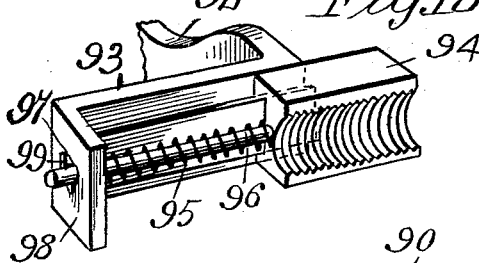
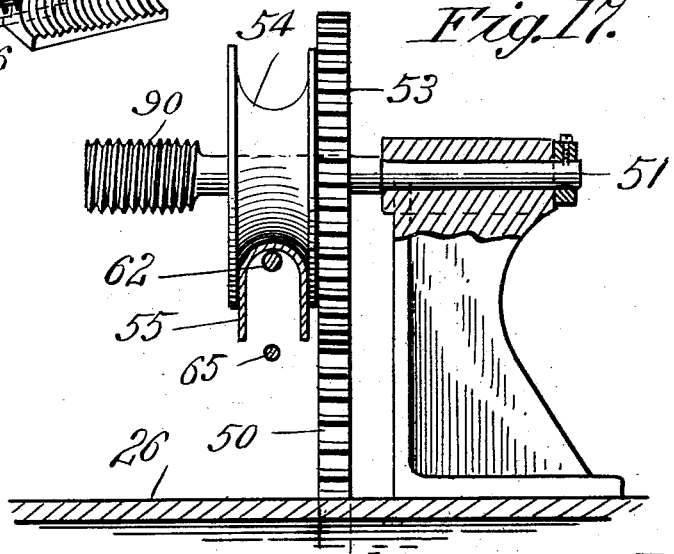
Witnesses:
J. H. Garfield
M. A. Campbell
Inventor
George Alfred Owen,
by W. F. Bellows
Attorney.

No. 677,423. Patented July 2, 1901.
G. A. OWEN.
MAIL SERVICE SYSTEM.
(Application filed Oct. 15, 1898.)
(No Model.) 13 Sheets—Sheet 12.
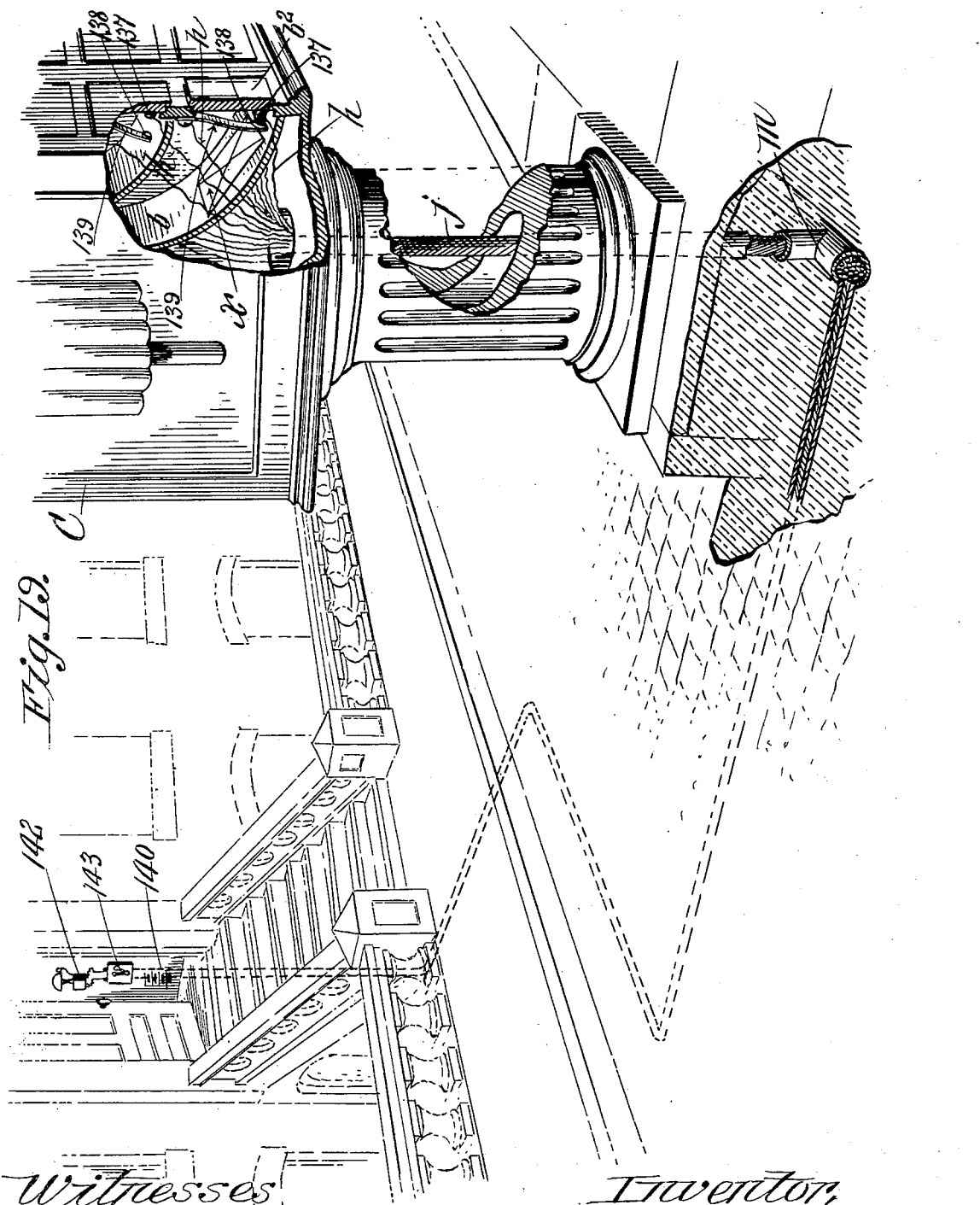

No. 677,423. Patented July 2, 1901.
G. A. OWEN.
MAIL SERVICE SYSTEM.
(Application filed Oct. 15, 1898.)
(No Model.) 13 Sheets—Sheet 13.
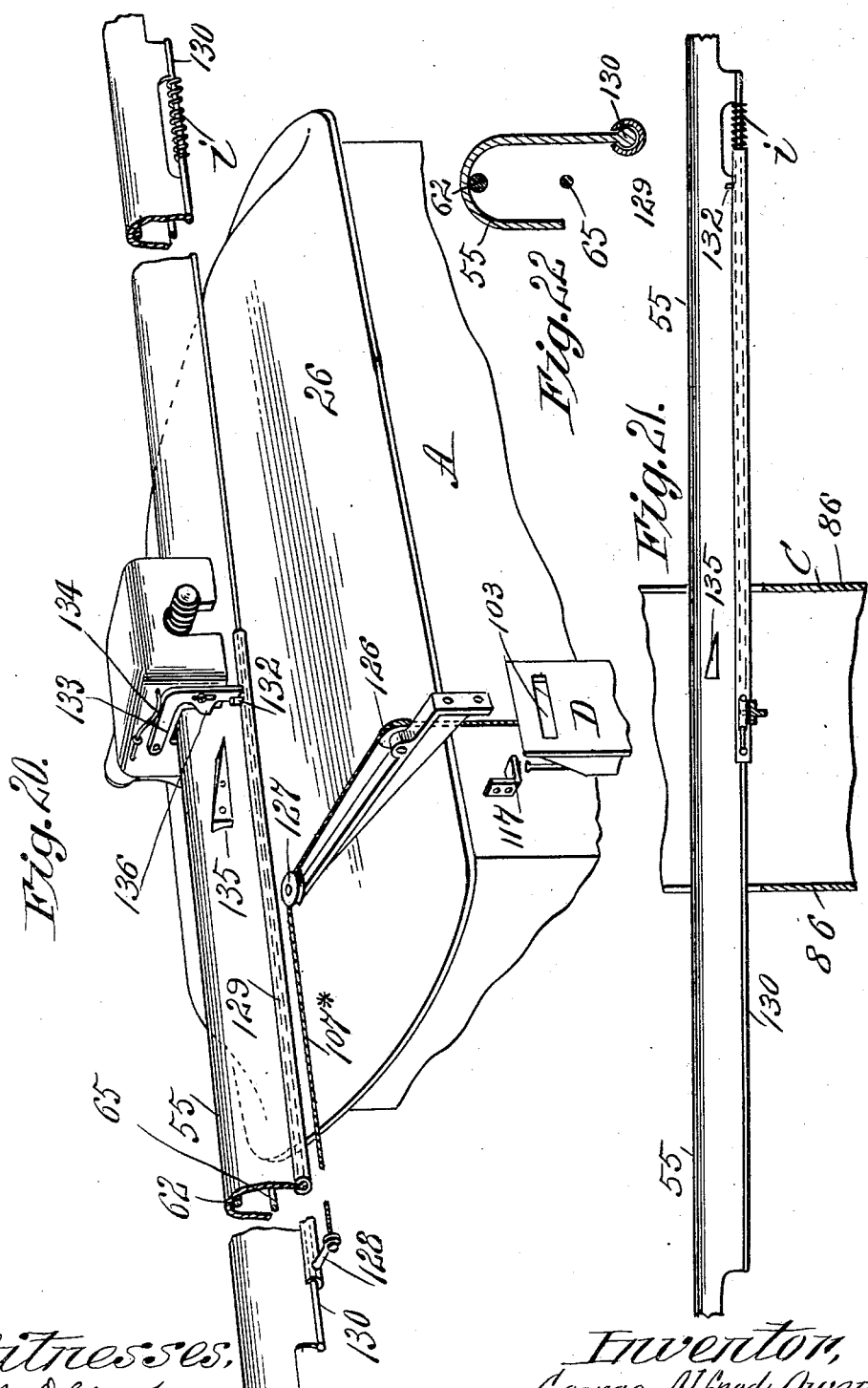

UNITED STATES PATENT OFFICE.

GEORGE ALFRED OWEN, OF SPRINGFIELD, MASSACHUSETTS.

MAIL-SERVICE SYSTEM.

SPECIFICATION forming part of Letters Patent No. 677,423, dated July 2, 1901.

Application filed October 15, 1898. Serial No. 693,614. (No model.)

*To all whom it may concern:*

Be it known that I, GEORGE ALFRED OWEN, a citizen of the United States of America, and a resident of Springfield, in the county of Hampden and State of Massachusetts, have invented certain new and useful Improvements in Mail-Service Systems, of which the following is a full, clear, and exact description.

This invention relates to new and improved means for the distribution in post-offices of the individual mail into respective receptacles or compartments therefor in a conveyer or mechanical carrier, to means for the guidance, support, and propulsion of the carrier, to stations comprising mail-receiving boxes, post-stations located at suitable intervals or places in the city or town into which certain portions of the assorted mail for individuals are respectively delivered, and to means for automatically collecting in a suitable receptacle therefor in the conveyer the promiscuous mail-matter that may have been deposited in a mailing-box at the post-station.

The invention contemplates the sorting of the mail for individuals at the post-office, the placing of the same in the compartments in the carrier, the then bringing the carrier onto the trackway therefor in which a feed-current is continuous for the propulsion of the motor with which the conveyer is provided, so that the conveyer will be caused to travel successively to the letter-box post-stations, delivering portions of the mail suitably distributed into the service-boxes therein, the conveyer being automatically stopped at the post-station to insure not only certainty of the delivery, but also to afford ample time for the reception therein of the mail-matter from the mailing-box in the given post-station, the conveyer then resuming its travel to the next post-station, where further portions of the assorted mail therein are delivered, as before, and further outgoing mail-matter received, and so on until all of the assorted contents of the conveyer have been delivered into as many post-stations as the conveyer has the capacity of serving and until the mail has been collected from such several post-stations, it being understood that the trackway may be advantageously arranged as a "belt line" returning to the post-office, whereupon the collected mail brought thereto may be removed from the conveyer and disposed of for transmission, as usual, and the conveyer again charged with a further assorted mail to be delivered to the post-station boxes on the next trip.

It will be further explained that the post-stations are to be located in communities with such frequency or closeness of disposition as to be near and convenient to residents or business men in the section, and that each resident, family, business man, or corporation, as the case may be, having a lock-box at the post-station procures the mail therefrom at his own convenience.

In short, it will be perceived that the object of this invention is to perform mechanically or electromechanically and automatically the work heretofore performed by postmen.

Another provision of the equipments consists in means for the notification by the operation of an audible or other signal to those for whom mail-matter has been deposited in their mail-receiving box at the post-station of the fact thereof, so that they may lose no time after the arrival into their box of their mail in taking it therefrom.

To these ends the invention consists in the construction of the conveyer with a view to its capacity for receiving the individual assorted mail thereinto and to its capability for discharging the mail in certain series of its compartments successively, and also in the construction of the conveyer whereby it is adapted for receiving the posted mail thereinto from the letter-boxes in the various post-stations; and the invention furthermore consists in the provisions for electrical propulsion of the conveyer and to constructions whereby the mail-receiving part of the conveyer may be detached from the motor-supporting portion, so that the compartments may receive in a convenient manner in the post-office while the motor-supporting portion remains supported upon or in connection with the trackway.

The invention furthermore consists in the trackway structure whereby provision is established for the feed and return currents for the propulsion of the conveyer and whereby the same is stable and durable.

The invention furthermore consists in the post-stations provided with the individual mail-boxes having upwardly-opening passages or chutes leading thereto and having a movable mail-elevating box, and in the combination of appliances provided in the station with appliances provided to the conveyer, whereby the conveyer is stopped at its arrival at the station momentarily, then caused to proceed in its travel and automatically discharged of the contents of a certain series of its compartments corresponding to the number of post-station receiving letter-boxes, and whereby the promiscuous outgoing mail posted in the letter-elevating box of the post-station will be delivered into the conveyer; and the invention furthermore consists in constructions, arrangements, and combinations of parts to the end of providing a practical and efficient system for the rapid, frequent, and inexpensive manipulation of the individual mail and one which may be maintained at small cost, all substantially as will hereinafter fully appear, and be set forth in the claims.

Reference is to be had to the accompanying drawings, in which the present system for individual mail distribution and delivery and for mail collection is illustrated, and in which—

Figure 1 is a perspective representation of the letter-box post-station, (which is understood as one of many provided at suitable intervals throughout the city or town or any given portion thereof,) of the trackway, and one of the mail delivering and collecting conveyers approaching the post-station. Fig. 2 is a perspective view illustrating the conveyer, portions thereof being separated one from the other, the motor-provided portion remaining on the trackway understood as entering a room in the post-office, while the portion thereof having the multiple series of compartments or receptacles for individually-assorted mail is lowered down below the track, and in connection with this lowered portion of the conveyer is shown the raising and lowering support therefor and truck on which such support is mounted. Fig. 3 is substantially a longitudinal vertical section through the conveyer, the motor for its propulsion and the trackway on which it runs being shown in side elevation. Fig. 4 is a horizontal sectional view through the portion of the conveyer having the multiple series of compartments for the assorted mail to be delivered. Fig. 5 is a cross-sectional view, on an enlarged scale, showing the trackway and a portion of the supporting-bracket therefor, together with the parts comprised in the feed and return conductors and indicating by dotted lines the bearing positions of the roller-wheels provided on the motor-conveyer. Fig. 6 is a sectional elevation of the same part shown in Fig. 5, as seen at right angles thereto, the aforenamed roller-wheels being, however, omitted. Fig. 7 is in the nature of a diagram designed to illustrate in a simple manner the current-conductors and provisions for the electric circuit through the trackway. Fig. 8 is a central vertical section through one of the stations comprising the series of letter-boxes corresponding to individuals to be served adjacent such post-station and indicating by dotted lines the location of the box for posting the outgoing mail. Fig. 9 is a horizontal section and partial plan view as taken on the line 9 9, Fig. 8. Fig. 10 is a vertical section substantially on line 10 10, Fig. 9, but on an enlarged scale, of the box for the outgoing mail provided in the post-station. Fig. 11 represents in horizontal sectional view and partial plan the relations of the conveyer and its conjunctive appliances to those of the station at the time the conveyer has entered and stopped at the post-station. Fig. 12 is an elevation of the parts referred to in Fig. 11, such view being taken endwise of the conveyer. Fig. 13 is an elevation, with portions broken out and in section, of the same parts shown in Fig. 12, but as taken at right angles thereto. In both Figs. 12 and 13 the common elevating mail-box in the post-station for the outgoing mail is shown as elevated to its position for delivering into the conveyer. Fig. 14 is a sectional elevation through the post-station as seen in the opposite direction from Fig. 13, the parts being in their normal positions, as is the case in the absence of the conveyer from within the station, whereupon the common letter-box for the post-station is in its lowered position, which is the position which it occupies for the reception of the mail to be posted thereinto. Fig. 15 is a view similar to Fig. 14, but showing the movable parts as in their positions established by the entrance of the conveyer through the station, the movable mail-box being elevated into its mail-discharging position. Fig. 16 is a sectional elevation of the truck-supported elevating and lowering device for the one separable portion of the conveyer. Figs. 17 and 18 are views in sectional elevation and perspective showing the automatic mechanism in detail for stopping the motor-conveyer and for permitting it shortly thereafter to resume its travel. Fig. 19 is a perspective and sectional view through a part of a post-station comprising the individual letter-boxes and showing in conjunction therewith the means for electrically operating the signaling apparatus which indicates in an adjacent house the presence of mail-matter in a given letter-box corresponding to such house. Fig. 20 is a perspective view, Fig. 21 a side elevation and partial sectional view, and Fig. 22 is a cross-sectional view, illustrating a modification in the construction of the means actuated by the presence of the conveyer within the elevated post-station letter-box.

Corresponding parts in all of the views are denoted by like characters of reference.

I will first proceed to describe the conveyer, represented at large by the letter A.

The conveyer comprises the body portion in the form of a rectangular casing 25, open at its base and having the detachable top or roof 26, carrying the electric motor B. The conveyer-casing has provided therein, tier above tier, the multiple series of compartments 27 27, one horizontal tier or series being separated slightly from the next, and the compartments of every series are open at top and base, as shown in Fig. 3, and, as seen in Figs. 2 and 4, the conveyer-casing has tiers of its multiple series compartments at the one side separated from a like number of sets of the compartments at the other side by the partition 28, vertically and longitudinally provided, dividing the casing. Each horizontal tier or series of the individual mail-receiving compartments 27 has a removable base, constituted by the respectively provided curtain or flexible apron 29, having winding connection with the spring-actuated roller 30, which latter has no novelty in itself, being the same or analogous to an ordinary spring-curtain roller. From the roller the curtain is unwound and drawn horizontally under the horizontal series of compartments to the opposite end of the casing, where it is temporarily connected by a catch or detent 32 or pairs thereof for each curtain mounted on the respectively provided rock-shaft 33, having the weighted arm 34 for holding the detent up to its engagement position. The end of the curtain to be engaged by the detent or detents therefor is provided with a suitable metallic engagement member or members 31, provided at the free end of the curtain.

In addition to the catches or detents 32 at the ends of the multiple series of the compartments there are similarly-provided rock-shafts traversing thereunder at suitable intervals intermediate between the ends of the series of compartments, so that even when the curtain is released at its point of restraint under the end compartments of the series and left subject to being drawn horizontally thereunder it will be intersected and arrested by restraining devices in succession, so as to still provide bases for subdivisions or minor series of the whole series in one tier. Each detent-carrying rock-shaft has at its end outside of the conveyer-casing the upstanding lever-arm 35, which when swung by being contacted upon by an abutment 36, Fig. 12, within the post-station through which the conveyer passes, will cause the detents on such rock-shaft to be disengaged from the end of the curtain, leaving the curtain free to be drawn from under the minor series of the tier of compartments located between one detent and the next.

It will be explained that it is a simple matter to so arrange the detent-carrying rock-shaft arms 35 and the abutments 36 in the post-stations that the one post-station abutment will engage and trip only one of the arms 35, all the others escaping such abutment. In other words, in each post-station is an abutment which will serve to liberate the flexible and movable base under a certain number of the compartments which are to deliver the assorted individual mail therein into the receiving-boxes corresponding thereto in the post-station.

The conveyer after a trip comes around or returns back to the post-office with all of its curtains completely wound upon the respective rollers therefor, so that all of the compartments are then baseless.

The compartments are of uniform size, so that each one of a given tier is directly over that of the tier below.

The mail-distributer, by a rod 37, entered through a perforation 38 in the end of the conveyer-casing, forces the curtain (by having the rod in forcing engagement against the angular upturned metallic end of the curtain) for the lowermost multiple series of the compartments forward to be engaged by the detent at the farther end, thereby providing the base for the lower series. He then drops the mail for individuals into the compartments of the lower series, respectively, as occasion requires, they passing thereto through the then baseless compartments above, and so as soon as the lower series compartments have received their charge the curtain to constitute the base for the second series from the bases is drawn thereunder and engaged with the catch device therefor, and after that series has received its properly-distributed mail the base-constituting curtain for the third lowest compartment is drawn thereunder and restrained, and so on up to the last one, when the charging of the conveyer is completed.

The weights 34, aforementioned, maintain the catches in their positions of engagement with the end pins 31 of the curtain, and the stop-pins 40 prevent the weights from swinging the upstanding arms beyond their proper normal positions.

As shown in Fig. 4, where there are two banks of tiers of the multiple-series compartments occupying different side portions of the space within the casing of the conveyer, the rock-shafts on which the detents for the curtain of the tiers of each of the side portions are mounted are sleeved the one over the one end half of the other, each rock-shaft having its individual upstanding arm 35, the weight for retracting it to its normal position after it has been swung to its releasing position, and also the paired detents or catches.

The capacity of the conveyer here illustrated is fourteen hundred compartments, although the number is to be variable in different places in accordance with the mail-service demands. As I have designed this conveyer the size of each individual mail-space is length five inches, width one and one-half inches, and depth eight inches. The conveyer may be manufactured entirely of aluminium.

The rectangular compartment-casing, constructed open both at its top and its base, except as regards the trap-door 42 at the base along one side thereof, as hereinafter referred to, has the separable top or roof 26, which fits over the upper edge of the compartment-inclosing casing in the manner of a telescoping box-cover and has the swing-bolts 43, which engage within the recesses therefor in the lugs 44 on the sides of the casing, the nuts 45 binding and retaining the parts in their temporary connection, whereby the conveyer-casing and its motor-supporting top are for the time being stably united as an integral structure.

The motor B is suspended on the brackets 46, depending below the conveyer-top 26, the motor comprising, as usual, the field-magnets 47, the armature 48, having on its shaft the pinion gear-wheel 49, with which meshes the gear-wheel 50, also mounted to rotate in a journal provided beneath the conveyer-top, said gear-wheel protruding upwardly through an aperture in the top and driving a gear-wheel 52, journaled in the upstanding bracket 53, having united thereto the roller-wheel 54, the edge of which is grooved or hollowed to run on the rounded top of the inverted-trough-shaped track 55.

The conveyer-top is provided with transverse bar 56, the depending ends of which form supports for such bar, whereby it has its position above the conveyer-top, as seen in Fig. 2, and engaged with this bar 56, by the eyes thereof, are two upstanding arms 57 57, carrying journaled between their ends the grooved roller 58, which also runs on the track. Toward the opposite end of the conveyer from that at which said roller 58 is located is another grooved roller having a rolling engagement on the top of the track, the same being journaled in the rigid upstanding bracket 60. The rollers 59 58, the latter being in a manner loosely mounted for yielding transversely, as permitted by the possibility of the arms 57 sliding relatively to the bar 56, in conjunction with the motor-driven traction-roller 54, serve to prevent the traction-roller from jumping by being disengaged from the trackway, and yet permit easily the rounding of curves, as occasioned by the feed-conductor having its course from one street into another at right angles thereto.

The inverted-trough-shaped track 55 rests upon a wire or cable 62, located beneath its crown or arch-shaped top, and at intervals supporting bracket-arms 63 are provided at the upper end of posts 64, which primarily support the track and feed conductors. Ranging along parallel with and beneath the cable is a wire or continuous electric conductor 65 for the return-current, the same being provided with a tongue or web 66, whereby it is supported between clamping-blocks 67 67, which are located within the trough-track, and one side section of which is bolted to the bracket-arm 63, as aforementioned. The said blocks 67 67 are advantageously of wood, although they may be of metal or any suitable material. The return-current conductor 65 is insulated in any suitable manner from the trackway, and in the drawings, Fig. 5, is shown a section 68 of said tongue, which is of insulating material.

The conveyer is shown as having at its top the upwardly-inclined trolley-arm 70, carrying at its extremity the grooved trolley-wheel 72 in underrunning bearing against the return-conductor, the same being by the wire or conductor 73 suitably connected with the motor, and the wire 74, Fig. 3, is also connected with the motor and through the traction-roller wheel 54 with the track or rail 55.

In Fig. 7, 75 conventionally indicates a dynamo machine or generator, 76 being the feed-wire connecting the same with the feed rail or track 55, the track and return wire at the end of the track being connected by the wire 77, and the return-wire is by the conductor 78 connected back to the generator. In practice the joining of the feed-track and return-wire may be near or within the post-office, to which these parts are returned after extending outwardly through the streets of the city, and the generator may also be located in or near the post-office. When the motor-conveyer is on the track with the underrunning trolley 72 in contact against the under side of the return-wire 65, the current or a portion thereof will be short-circuited through the motor driving the same for the propulsion of the conveyer, as well known.

It will be here mentioned that the conveyer-casing has at its one side the compartment $a$, with the down-swinging door 42 and a fastening device 79 for holding the latter closed. The conveyer, moreover, has the aperture 80 extending along its side, closing which are the door-sections 82, arranged to be inwardly swung by pressure from without against their springs 83, which maintain them normally closed. This compartment is for the purpose of receiving the mail posted in the post-stations to be brought by the conveyer to the post-office for outward transmission.

C represents one of the post-stations, the same consisting of a suitably bulky hollow casing supported by a post or pillar 84, having base-prongs 85, whereby it is anchored in the ground or pavement in a secure and stable manner, these post-stations to be approximately ten or twelve feet high and to be made of art metal. The lower portion of the post-station casing comprises a series of letter-boxes or mail-receiving receptacles $b$, forwardly opening, the same having individually and respectively leading thereto the chutes $d$, upwardly opening in checker-board arrangement, their ends or mouths all being in the same horizontal plane, as indicated in Figs. 8 and 9, which arrangement corresponds to or matches with some predetermined portion or subseries of the conveyer-compartments, so that when the conveyer is brought and stopped to register directly over the upwardly-opening orifices of the chutes leading into the individual mail-receptacles and the temporary base for such series of the compartments is removed from thereunder the mail will fall and be conveyed through the chutes to the individual boxes, each of which has its locking-door $b^2$. For instance, there may be for the first post-station forty letter-boxes and forty chutes conveying downwardly and forwardly thereinto, and it may be provided that the forty compartments of the lowermost tier in the forward right-hand corner of the conveyer will be automatically discharged of the mail-matter therein into said chutes, and for the next post-station the series next to the left of said compartment will be discharged, or it may be so provided that the next series of compartments behind the one first delivered will be discharged, this merely depending on prearrangement, providing properly the location of the abutment 36 in the upper part of the post-station through which the conveyer is passed.

The post-station structure has its casing preferably widened at its upper part, substantially as shown, and is provided at its ends with the flap-doors 86, the forward pair of these doors as regarded relative to the course of travel of the conveyer opening forwardly outward, while the other pair of doors are arranged to open forwardly inward, as seen in Figs. 11 and 13, suitable closing-springs 87 being provided at the hinges of the doors, as indicated in Fig. 12.

It is perceived that the trackway and feed conductors pass through the station near the upper central portion thereof.

It is of course required that the conveyer coming within the upper part of the post-station will briefly remain therein before proceeding through and to the next post-station to afford time for the delivery of the assorted mail and for the taking on of the promiscuous mail, which may have been posted in the station, and as means to this end attention is called to devices, as follows: The journal-shaft of the traction-roller 54, which is driven by the motor B, has the axially-extended left-hand screw 90, provided with a coarse thread. (See Figs. 11, 12, and 17.) A bracket-arm or support 92 projects from the one side wall of the station near the top thereof having the transversely-supported bar or portion 93, its line of extension horizontally being above the top 26 of the conveyer and at the level of the screw; but the innermost end of this bracket is offset from the position of the said screw-ended part 90. The said portion 93 constitutes a guideway with which one side of the half-nut 94 has a horizontal sliding engagement, a dovetailed rib-and-groove engagement being shown, and the half-nut is normally projected to occupy a position across the longitudinal line along which the screw 90 moves in unison with the conveyer by reason of the spring 95, which surrounds the rod 96, which is provided as an end extension of the half-nut and which plays through a perforation 97 in the angular lug 98, formed as a part of the bar 93, said spring being interposed between the lug and the end of the half-nut, and the stop 99 prevents the spring from forcing the half-nut in an undue extent along the said part 93.

As indicated in Fig. 7, the portion of one of the current-conductors adjacent the post-station C—here the return-conductor—is covered with insulating material 100 for a suitable length, so that as the conveyer approaches the post-station the current will not be carried through the motor for the positive propulsion thereof, but the conveyer will for a short time be run by momentum for the instant just before reaching the stop; but the insulated section terminates just before the screw has come into engagement with the half-nut, so that then a driving impetus will be given to the armature and connected wheels of the motor and the motor-shaft will be positively driven to insure the turning of the screw to crowd the half-nut endwise out of engagement therewith, whereupon the nut ceases to remain an impediment to the further travel of the conveyer, which will after having tarried long enough within the post-station for the mail delivery and mail collection be permitted to resume its travel, it almost immediately coming upon an uninsulated current-conductor. The length and arrangement of the insulation may be regulated to correspond to the power and freedom of running or of maintaining rotary movements of the shaft 51 and connected parts impelled by the motor.

The provision of the insulating-covering on one of the feed-conductors adjacent the station is to minimize violence of contact by the conveyer against the temporarily-obstructing half-nut.

D represents the mail-receiving receptacle within the post-station, in which is posted the mail for outward transmission, the same being movable. The normal position of this letter-box is in a suitable space therefor alongside the series of individual lock-boxes, the casing or wall of the post-station at a suitable height above the ground having the mailing-slot 102 therethrough, which communicates with the opening 103 in the front of said letter-box D. (See Fig. 10.)

This letter-box, as shown, is of rhomboidal form, its inclined walls being at top and base and in its rear wall next to its inclined base is an outwardly-opening door 104, which closes the discharging-opening for the box. This door has within the box, radially extended from the hinge, the rigid lever-arm 105, with which is connected the vertical rod 106, upwardly extended to a perforation in the top of the letter-box and terminating above said top. This letter-box D is by the cord or other flexible support 107 suspended, the cord having a winding engagement around the drum 108, and suitable guides 109 109 are provided for the vertical movements of the cable and drum-supported and elevated letter-box. The drum 108 has on the shaft which constitutes its journal-support in the upper part of the casing a pinion 110, with which meshes the sector-like rack-gear 112, which is carried at the upper end of a lever 113 and is pivotally mounted at 114 upon the inner side of the wall of the post-station, the relative location of the sector to the drum-pinion being best seen in Fig. 11. A link 115 connects one of the inwardly-opening doors 86 and said sector-carrying lever, so that when the said door is inwardly swung parallel with the side of the station-wall this part will automatically insure the swinging of the sector-lever and the rotation of the drum elevating the movable post-station mail-box up alongside of the conveyer next to the mail-receiving compartments $a$ thereof, and so that the door 104 thereof is opposite some one of the sectional doors 82 82, closing the long opening leading into the said conveyer-compartment $a$.

It will be perceived, Figs. 11 to 15, that there is within and near the top of the station a lug or abutment 117 directly over the aforementioned thrust-rod 106, and against which when the letter-box D is elevated said thrust-rod is crowded and relatively moved, positively opening the letter-box door 104, and the positive and forcible opening of said letter-box door in turn opens one or perhaps two of the sectional doors leading into compartment $a$, whereupon the mail in box D will slide into the receptacle $a$ therefor in the conveyer and be carried by the latter from the station ultimately and with accumulation of mail similarly received from other stations back to the post-office.

It will be apparent that the departure of the conveyer from the post-station permitting the station-doors to close automatically under the reaction of their springs will insure that the letter-box D will descend to its normal position in the lower portion of the station.

Provision is made against the mailing of letters, &c., through the slot 102 in a station during the time the conveyer remains thereat and when the box D is not in its lowered place to receive such mail-matter, and to this end a plate or shield 120 is movably guided within the wall of the post-station, it remaining normally under the mailing-slot 102, said shield having the rearwardly-extended lower edge portion or lug 122, provided with a depending guide-rod 123, around which is the coiled spring 124, in compression between said part 122 of the shield and the lug 125 therebelow, through a perforation in which said rod has its guiding play. The lower end of the letter-box in descending by its engagement with the rearwardly-offset part 122 forces the shield into its lowermost position against its elevating-spring, leaving the rear orifice of said slot 102 uncovered; but, as is plain, the removal upwardly of the letter-box leaves the spring unrestrained to force the shield to its slot-obstructing position.

In Figs. 20, 21, and 22 a modification in the construction which constitutes the means for elevating and lowering the letter-box within the post-station is illustrated and will be now described.

Instead of employing an elevating-drum from which the box is cord-suspended and providing means for rotating the drum I may employ a suspension-cord 107*, which passes upwardly from the box D over and around the two guiding-sheaves 126 127 to connection with the projection 128, which is affixed as an angular part to the tube 129. It will be perceived that one depending edge portion of the conductor-track 55, which is within and adjacent the post-station, is formed with the bead 130, which forms a longitudinal support and guide for the said tube. Said tube has also a second angular projection 132.

The shield or casing $f$, which forms the inclosure for the motor-gearing above the conveyer, has pivoted thereon the angular lever 133, held in its depressed position by the spring 134, and its extremity normally in the course of its bodily movement, traveling in unison with the conveyer in striking against the said projection 132, will force the tube endwise, elevating the box to the same relative position and for the same purpose, as hereinbefore explained.

On the side of the track 55, suitably located, is an incline 135, against which the offset portion 136 of the angular lever has an impingement at about the time the tube has been sufficiently endwise moved to secure the elevation of the letter-box, so that said lever is swung from its engagement with the projection 132 of the tube, and on such disengagment from its forwardly-forcing pressure by the said bodily-carried lever 133 the tube will be retracted as occasioned by the weight of the letter-box, so that as the box is lowered the said tube will reach its endwise rearward position to be again forwardly moved on the approach of the next conveyer similarly equipped.

$i$ represents a buffer-spring against which the tube has a cushioned impact as the letter-box D reaches its lowered position.

Holders of boxes $b$ in post-stations may, some or all thereof, have equipments whereby signals in their houses may be operated to notify them of the presence of mail in their respective boxes, and referring to Fig. 19 in the drawings electric signaling appliances are illustrated. $h$ represents wires constituting a normally-open electric circuit with contacts or circuit-closers 137 138 connected to their terminals, one of the contacts 139 being carried by the spring-arm 139, located at the front of the letter-box, with its end near the base of the box and adapted to be moved by the pressure of a letter or other mail-matter thereagainst from behind onto the contact 138 to close the circuit. The circuit-conductors are extended into the premises of the box-holder, having connected thereinto in the usual way a battery 140 and a signaling device 142, which is here represented as consisting of a bell and electrically-actuated vibratory striker. In said view, Fig. 19, a letter is represented at $x$ as having come down the chute into the letter-box and operating to close the circuit.

In order that the bell may not be sounded except when it shall be so desired, a switch 143 is shown for the purpose of cutting out the signaling apparatus.

It will be found desirable to leave the switch open when a box-holder is absent and at night, so that even when there is mail-matter in the box at such times or under other circumstances the bell will not be sounded and continued to sound to no good purpose and whereby the battery will not be unnecessarily run down.

As shown in Fig. 19, the electric wires comprised in the several circuits respectively provided for the individual mail-receiving boxes in the post-station are in their course downwardly away from their connection with the contacts 137 138 brought together and combined in the cable $j$, as indicated in Fig. 19, they being suitably insulated, and this cable is passed downwardly through the hollow pillar 84, which supports the station structure. The electric wires are carried underground and inclosed in the conduit $m$, ranging along under the street in a community for which the given station serves, the individual circuit-wires branching therefrom into the houses in an obvious manner sufficiently represented in the drawings.

The conveyer, having the considerable capacity for individual mail and for collected mail, being necessarily comparatively bulky and heavy renders the employment of a lowering and elevating means for the compartment-provided body portion thereof most advantageous, as well also as does means for moving said conveyer-body from its position under its track-supported top to one where the distribution or assortment of the mail in the post-office takes place and for the return thereof, and in Figs. 2 and 16 is illustrated a truck having an elevating and lowering platform.

144 represents the main platform of the truck, provided with flanged wheels or rollers 145 145 to run on the trackway 146.

147 represents the elevating-platform, the same being supported on the pairs of crossed arms 148 148, pivoted both to the lower and upper platforms and arranged in the manner of the members of lazy-tongs.

The shafts or rods 149 149, constituting the pivotal connection of the upper ends of said arms with the blocks 150, which move in the slideways 151 of the upper platform, have provided thereon the blocks 152, which have threaded openings therethrough which are tapped for the reception and engagement of the right and left hand threaded portions of the screw-shaft 153, which is journaled for rotation and restrained against endwise movement in brackets or journal-supports 154 at the opposite ends of said platform 147. Said shaft is provided with a handle, lever, or crank 155, by means of which to turn it, whereby, as is plain, the upper platform will be elevated or lowered accordingly as the shaft is turned in the direction to contract or distend the crossed arms 148 148.

In Figs. 1 and 8 the post-station C is represented as having its enlarged upper portion, through which the conveyer is to be passed, widened outwardly, the lower portion of the station not projecting beyond the edge of the sidewalk, and the post 64, which supports the trackway, has its upper part bent twice, so that there is a suitable clear space, as indicated at 61, Fig. 1, directly under the trackway for the unimpeded passage of the conveyer.

Having thus described my invention, what I claim, and desire to secure by Letters Patent, is—

1. In a mail-service system, a conveyer having a mail-receiving receptacle, means for the support, guidance and propulsion of the conveyer and post-stations located at suitably-distant intervals to and past which the conveyer is carried, provided with a mail-box and means operated by the presence of the conveyer at a post-station for discharging the mail-matter in the post-station mail-box into the receiving-receptacle therefor in the conveyer.

2. In a mail-service system, a conveyer having downwardly-opening compartments therein for the individual mail and removable bases therefor and provided with a motor and a traction wheel or roller therewith connected, means for the support and guidance of the conveyer, and feed and return current conductors, with which the motor is in electrical connection, and a source of electrical energy therewith connected, and post-stations located at suitably-distant intervals to and past which the conveyer is carried having individual upwardly-open mail-receiving receptacles, and means for insuring the automatic displacement of said removable bases for permitting the discharge from the conveyer of the individual mail therein into the corresponding receiving-boxes therefor in the post-stations, for the purpose set forth.

3. In a mail-service system, a conveyer having compartments therein for the assorted individual mail and having a receiving-receptacle, means for the support, guidance and propulsion of the conveyer, post-stations located at suitably-distant intervals to and past which the conveyer is carried, having individual-mail-receiving receptacles and having an elevating mail-box in which promiscuous mail may be posted, means for insuring the discharge from the conveyer of the individual mail therein into the corresponding receiving-boxes therefor in the post-stations, and means operated by the conveyer at a post-station for insuring the discharge of the promiscuous mail from the post-station mail-box into said receiving-receptacle therefor in the conveyer.

4. In a mail-service system, a conveyer having compartments therein for the assorted individual mail, having a receiving-receptacle, and provided with an electric motor having a roller or traction-wheel therewith connected, means for the support and guidance of the conveyer, an electrical feed-conductor with which the said motor is in electrical connection, stations to and past which the conveyer is carried, having individual-mail-receiving receptacles and having a receptacle for mail posted thereat, means for insuring the discharge from the conveyer of the individual mail therein into the corresponding receiving-boxes therefor in the post-station, and means operated by the conveyer at a post-station for insuring the discharge of the mail from the station mail-box into said receiving-receptacle therefor in the conveyer.

5. In a mail-service system, a conveyer having compartments therein for the assorted individual mail with removable bases or temporary supports for the mail therein, means for the support, guidance and propulsion of the conveyer, post-stations located at suitably-distant intervals to and past which the conveyer is carried, having individual-mail-receiving receptacles with upwardly-opening chutes or passages leading thereto, and having their arrangement corresponding to that of given like series of said conveyer compartments and directly over which the conveyer is guided in its intermittently-traveling course, means actuated by the presence of the conveyer at a post-station, for insuring the displacement of the removable base for those compartments corresponding to the receiving-boxes therefor in the post-station.

6. In a mail-service system, a conveyer having compartments therein for the assorted individual mail, a movable base to support the mail therein, a catch for restraining the base in its position under the compartments, a spring for exerting a withdrawing force on said base, means for the support, guidance, and propulsion of the conveyer, a post-station to and past which the conveyer is carried, having individual-mail-receiving receptacles with upwardly-opening chutes or passages leading thereto, and having their number and arrangement corresponding to that of a given series of said conveyer-compartments and directly over which the conveyer is guided in its intermittently-traveling course, an abutment provided at the post-station against which said restraining-catch contacts for the release of the latter insuring the displacement of the removable base for those compartments corresponding to the receiving-boxes therefor in the post-station.

7. In a mail-service system, a conveyer having compartments therein for the assorted individual mail, a spring-roller, a curtain having a winding engagement with the roller and adapted to be drawn under the compartments to constitute a temporary base therefor, a catch for restraining the curtain in its position under the compartments, means for the support, guidance and propulsion of the conveyer, a post-station to and past which the conveyer is carried, having individual-mail-receiving receptacles with upwardly-opening chutes or passages leading thereto, and having their number and arrangement corresponding to that of a given series of said conveyer-compartments, an abutment provided at the post-station and operating on the presence of the conveyer at the post-station for the release of the catch insuring the displacement of the removable base for those compartments corresponding to the receiving-boxes therefor in the post-station.

8. In a mail-service system, a conveyer having compartments therein for the assorted individual mail, a spring-roller, a curtain having a winding engagement with the roller and adapted to be drawn under the compartments to constitute a temporary base therefor, a rocker-shaft on the conveyer having a catch for restraining the curtain in its position under the compartments and having a shaft-rocking arm, means for the support, guidance and propulsion of the conveyer, a post-station to and past which the conveyer is carried, having individual-mail-receiving receptacles with open chutes or passages leading thereto, an abutment provided at the station and operating on the presence of the conveyer at the station to swing the said shaft-rocking arm for the release of the catch insuring the displacement of the removable base for those compartments corresponding to the receiving-boxes therefor in the post-station.

9. In a mail-service system, a conveyer having compartments therein for the assorted individual mail, a spring-roller, a curtain having a winding engagement with the roller and adapted to be drawn under the compartments to constitute a temporary base therefor, two or more rocker-shafts on the conveyer having catches for restraining the curtain in its position under the compartments and having shaft-rocking arms, means for the support, guidance and propulsion of the conveyer, post-stations to and past which the conveyer is carried successively, having individual-mail-receiving receptacles with open chutes or passages leading thereto, an abutment provided at a suitable position at each post-station and operating on the presence of the conveyer at a given post-station to swing one of the said shaft-rocking arms for the release of the catch insuring the displacement of the removable base for the portion or series of the compartments corresponding to receiving-boxes therefor in such post-stations.

10. In a mail-service system, a conveyer consisting of a hollow body or casing open at its base and having therein a plurality of compartments for assorted individual mail, a movable base provided in common to, and capable of covering a series of said compartments at the bases thereof for the compartments, means for insuring a displacing movement to said base from under the compartments, restraining devices for confining the base temporarily in position under the several compartments of a series, and a device for operating the restraining means, for the purpose set forth.

11. In a mail-service system, a conveyer consisting of a hollow body or casing open at its base and having therein several horizontally-arranged series of compartments for assorted individual mail, arranged, the various series, in tiers one above the other, a movable horizontal base for each tier of the compartments, means for insuring a displacing movement to the base from under the compartments, one after another successively from the lowermost to the upper one, restraining devices for confining the said base temporarily in position under their respective compartments, and devices extended externally of the conveyer, for operating the restraining means, for the purpose set forth.

12. In a mail-service system, a conveyer consisting of an open-base casing having therein a plurality of individual-mail compartments and having an opening through its end wall, a spring-roller, a curtain or flexible apron having a winding engagement on said roller and adapted to be drawn therefrom temporarily under the compartments, a catch device to engage the curtain, catch-device-operating extension externally of the conveyer to be automatically actuated in the manner set forth, combined with a rod for insertion through said opening to force the curtain to its catch-restrained position under the compartments.

13. In a mail-service system, a conveyer consisting of a motor-carrying top and a hollow body or casing open at its base and having therein a plurality of compartments at the same level, a movable base for compartments, means for, and in common to a series of the compartments insuring a displacing movement of the base from under the compartments, restraining devices for retaining the base in place under the compartments, a device extended externally of the conveyer operating to release the restraining device, a trackway on which the conveyer has a running support, provided with a current-conductor for the propulsion of the motor on said track, substantially as set forth.

14. In a mail-service system, a conveyer consisting of a motor-carrying top, and a hollow body or casing separable from said top, open at its base and having therein a plurality of compartments, a movable base for the compartments, means for insuring a displacing movement of the base from under the compartments, restraining devices for retaining the base in place under the compartments, a device extended externally of the conveyer operative to release the restraining device, combined with a trackway on which the conveyer has a running support, provided with a current-conductor for the propulsion of the motor on said track, and means for temporarily connecting the compartment-casing to the motor-supporting top.

15. In a mail-service system, a conveyer comprising a casing open at its base, and having series of compartments for individual mail at opposite sides of the casing, separate curtain-rollers at the ends of and beneath the compartments provided with springs and curtains in winding engagement thereon, a rock-shaft extended from side to side of the casing provided with catches 32 and a rocking arm and a second rock-shaft sleeved on the first rock-shaft also provided with catches 32 and an operating-arm, substantially as described.

16. In a mail-service system, a conveyer comprising a casing open at its base and having series of compartments for individual mail arranged side by side, separate curtain-rollers at one end of, and beneath the compartments provided with springs, and curtains in winding engagement thereon, two or more rock-shafts arranged at the end of the casing, and between such end and the roller, extended from side to side of the casing provided with catches 32 and a rocking arm and a second series of rock-shafts sleeved on the first-named rock-shafts also provided with catches 32 and operating-arms, substantially as described.

17. In a mail-service system, a conveyer comprising an open-base casing having therein tiers of multiple-series compartments one above another, and comprising two tiers of such compartments occupying the side halves or portions of the casing, curtains to constitute movable bases for each side series of each compartment-tier, a spring-roller for each said curtain located within the casing at the end of, and beneath the respective compartment series, rock-shafts at the end of the casing opposite the curtain-roller and one or more like shafts between the ends of the casing, each extended from side to side and by one end projected beyond the casing, and provided with the rocking arm and also with catches 32 for the curtain end, other rock-shafts sleeved on the first-named rock-shaft movable independently thereof also having curtain-catches and the external operating-arms, substantially as and for the purposes set forth.

18. In a mail-service system, the casing of the conveyer open at its base and provided with base-opening compartments for individual mail, a curtain having at its free end engagement pins or members, and having a winding engagement on a spring-roller which is provided therefor at one end of the casing, a rock-shaft having the catch hooked arms thereof to engage the curtain-pins having counterpoise weighted arms for maintaining the catches in their positions of engagement having the upstanding arm for rocking the shaft and the stop 40 provided on the casing adjacent said arm, substantially as described.

19. In a mail-service system, the combination with the conveyer, substantially as described, having an electric motor provided with a traction-roller wheel 54, of the track 55, and the roller 58, the arms 57, 57, and the cross-bar 56, substantially as described.

20. In a mail-service system, the combination with the track of the conveyer having an electric motor and the traction-roller 54 therewith connected, the roller 58, the arms 57, 57, the cross-bar 56, and the upstanding bracket 60, supporting the roller 59, all as shown.

21. The combination with the track of inverted-trough form, a post-supported bracket-arm 63, the cable 62, the return-wire 65, having the tongue 68 comprising the insulating and the clamping blocks 67, 67, one united to the other and one thereof supported by said bracket 63, substantially as described.

22. The combination with electric conductor, trackway, of the conveyer consisting of a compartment-inclosing casing having the recessed lugs 44 and the separable top provided with the swing-bolts 43 and confining-nut, and having an electric motor, mounted thereon, and a traction-wheel driven by the motor, and running on said track, substantially as described.

23. In a mail-transmission system, the combination with the conveyer comprising the series of individual-mail compartments and means for automatically controlling the delivery successively from different portions thereof, and having the top 26 and an electric motor supported pendent therefrom within the conveyer provided with a pinion-wheel on its armature-shaft, a bracket or journal-support above the conveyer having the traction-roller and united gear-wheel journaled thereon and an intermediate gear between the aforesaid gear and pinion, and means for establishing a feed-current through the trackway.

24. In a mail-transmission system, in combination, a feed-conductor trackway, a motor-provided conveyer having a guiding-support thereon, a post-station past which the trackway has its course and provided with a movable arresting device thereat for the conveyer, and a device actuated by the motor of the conveyer for displacing said movable arresting device, leaving the motor free to have its propulsive movement after being arrested for an instant at the station, for the purpose set forth.

25. In a mail-transmission system, in combination, a feed conductor and conveyer support, and the motor-provided conveyer to run thereon having a motor-driven screw 90 located externally of the conveyer, a post-station past which the trackway runs having a half-nut normally in position across the path of the said screw, and adapted to be engaged by said screw, and movably supported whereby, through the turning of the screw said half-nut is forced away from its screw-obstructing position, permitting the resumption of the traveling movement of the conveyer, and means for returning the half-nut to its normal, obstructing position, substantially as and for the purpose set forth.

26. In a mail-transmission post system, the combination with the elevated conductor-trackway and the motor-provided conveyer, propulsively guided on said trackway and having the motor-driven screw 90, of a post-station past which the trackway extends, provided with a bracket or extension-support located adjacent the course of travel of the conveyer, and provided with the half-nut 94 having a sliding engagement on said support, and having a spring applied for normally forcing said half-nut into a position to be engaged by said motor-driven screw, carried by the conveyer, substantially as and for the purpose set forth.

27. The combination with the supporting part 93 mounted in a station and provided with the dovetailed rib and the angularly-arranged and perforated lug 98, of the half-nut 94 having a sliding support on said ribbed part 93, and provided with the extension-stem 96 passed through the perforation of said lug 98, and having the stop 99 and a spring 95, substantially as shown, and for the purpose set forth.

28. In a mail-service system, the post-station consisting of a suitable elevated hollow structure, a trackway extending through the top thereof, the said post-station having at a lower portion thereof, a series of letter-receiving boxes, and chutes leading respectively thereto from an upper portion of the station, said chutes being upwardly open for the purpose set forth.

29. In a mail-service system, the post-station comprising an inclosed hollow structure, having a post therefor on which it is supported in an elevated position and provided at its upper portion with a vacant space for the passage therethrough of a mail-conveyer, having swinging doors at its rear and forward ends, provided at a lower portion thereof with the series of individual letter lock-boxes having upwardly-open chutes leading downwardly thereto from a place within the post-station under the level traversed by the conveyer, and a supporting-trackway for the conveyer extending to and through an upper portion of the post-station, substantially as described.

30. In a mail-transmission system, a post-station having a letter-box therein for receiving mail posted at the post-station, a trackway running along and past the post-station, a conveyer propulsively supported on said track and provided at one side thereof with mail-receiving receptacle, elevating and lowering means for said post-station mail-box actuated by the presence of the conveyer within the post-station, whereby the box may be raised to deliver the contents thereof into the receptacle therefor in the conveyer.

31. In a mail-transmission system, a post-station having therein a movably-supported letter-box with an opening through its side for the discharge therethrough of its contents, and having an inclined base, the trackway, the conveyer having the mail-receiving receptacle *a* with sidewise opening thereinto, means actuated by the conveyer, provided in the station for elevating and lowering the post-station mail-box upon the presence of the conveyer at the post-station, whereby the box may be brought to its delivering position, opposite the open-sided receptacle for the reception of the mail in the conveyer, and means for maintaining the post-station-mail-box-discharging opening closed, while in its lowered positions, substantially as and for the purposes set forth.

32. A conveyer provided with the multiple series of individually-assorted-mail compartments, and means for insuring successively the discharge of different portions thereof as explained, and having in the side thereof, the mail-receiving compartment *a*, provided with the sectional inwardly-opening doors 82, 82, and closing-springs therefor, as described.

33. In a mail-transmission system, a post-station having therein removably-supported letter-box with a mail-receiving opening and with a mail-discharging opening provided with a door, the trackway, the conveyer, having the mail-receiving receptacle *a* with a sidewise opening and spring-closed sectional doors therefor, means actuated by the conveyer provided in the post-station for elevating and lowering the post-station mail-box and for opening and closing the mail-box door, upon the presence of the conveyer at the station, substantially as and for the purposes set forth.

34. In a mail-service system, the combination with a conveyer having a compartment for the reception or collection therein of promiscuous mail, of a post-station to and past which the conveyer is moved having a mailing-box movably mounted and an opening through the wall of the post-station leading into said box, means actuated by the conveyer for moving the mail-box into delivering proximity thereto, a shield, to cover said opening, in relation to which the mail-box is arranged so as to open and close it by the changing positions of said box, substantially as described.

35. In a mail-service system, the combination with a conveyer having compartments from which to deliver individual assorted mail, and having a compartment for the reception or collection therein of promiscuous mail, of a post-station to and past which the conveyer is moved having a series of individual letter-boxes and having a mailing-box movably mounted and an opening through the wall of the post-station leading into said box, means actuated by the conveyer for moving the mail-box into delivering proximity thereto, a shield to cover said opening in relation to which the mail-box is arranged so as to open and close it by the changing positions of said box, substantially as described.

36. The post-station having the mailing-opening through its wall, the shield 120 provided with the abutment member 122 and having the guide-stem 123, the guide 125 for said stem and the spring 124 exerting elevating pressure upon the shield, combined with the movable letter-box arranged to engage the said shield-abutment, the conveyer having a mail-receiving compartment, and operating, when reaching a post-station, to move the mail-box for the delivery of its contents into said receiving-compartment, substantially as described.

37. The post-station having the mailing-opening through its wall, and provided internally with the abutment member 117 thereabove, of the post-station mail-box having the discharging-opening and a hinged door for normally closing the same, the lever-arm 105 secured to, and extending from the hinged edge of the door, the thrust-rod 106 secured to said lever, and means for elevating the mail-box whereby its thrust-rod is brought to a crowding engagement against and moved by said abutment, substantially as shown.

38. The post-station provided with the movably-supported mail-box D, and having a door 86, a drum provided with a pinion, and a cord or like flexible support for the mail-box having winding engagement with said drum, a sector-rack meshing said pinion and a connection between the door and said rack, whereby the opening and closing movements of the door cause rotational movement to said drum, substantially as and for the purpose set forth.

39. In a mail-transmission system, in combination, the post-station provided with the mail-box D, and having a door 86, a drum provided with a pinion, a cord or like flexible support for the mail-box having winding engagement with the drum, the pivoted lever provided with a sector-rack, a link connecting the door and said lever, the track extending through the station and the motor-provided conveyer movable on the track, and adapted to be passed through the station automatically operating said door, for the purposes set forth.

40. In a mail-transmission system, in combination, the post-station having the door 86, the pinion-provided drum, the sector-lever connected to the door, and the abutment 117, the station letter-box D, having the inclined base with the door 104 provided with the arm 105 radially extended from the door-hinge and the upwardly-extended thrust-rod 106, the drum-engaged box-supporting cord 107, the trackway and the conveyer, substantially as and for the purposes set forth.

41. In a mail-transmission system, the post-station, consisting of a hollow structure with vacant upper part and inwardly-opening flap-doors at its rear, and outwardly-opening flap-doors at its front and provided therewithin and therebelow with the upwardly-opening series of chutes which extend downwardly and forwardly terminating in mail lock-boxes $b$, having individual doors, the trackway extended through the upper part of the post-station, and the conveyer propulsively supported on the trackway and adapted to pass through the door-provided upper part of the post-station, automatically operating said doors, and means for normally maintaining said doors closed.

42. In a mail-transmission system, a post-station comprising a series of individual receiving letter lock-boxes, and a hollow post or pillar supporting said post-station, fixed and movable contacts in each box and normally open circuit-conductors therewith connected, and having connected therewith within houses or other desired locations, distant from the station, signaling apparatuses corresponding to the respective boxes, the movable contact in each box being adapted to be automatically closed against its adjacent contact by mail-matter in the box, the electric wires comprised in the several circuits being adjacent the post-station combined in a cable which is passed through said hollow pillar, substantially as described and shown.

43. The combination with one or more post-stations substantially as described, of an elevated trackway running through the upper part of each post-station, and a conveyer guided along the trackway with provisions for its propulsion, and adapted to pursue a course to and through the post-stations, and mechanism coöperating between each post-station and the conveyer when therein for effecting the delivery of mail from the conveyer downwardly to suitable receivers therefor in the post-station.

44. The conveyer having series of compartments in horizontal tiers as described, each downwardly opening, removable flexible closures for the lower openings of the several tiers of compartments, and a removable top for the conveyer, and means for detachably confining same.

45. In a mail-transmission system, post-stations having openings through upper portions thereof and individual boxes with upwardly-opening chutes or continuations all terminating in a horizontal plane and in proximity, as shown and described.

Signed by me at Springfield, Massachusetts, this 1st day of October, 1898.

GEORGE ALFRED OWEN.

Witnesses:
WM. S. BELLOWS,
M. A. CAMPBELL.